Feb. 17, 1970    J. P. CONNIFF ET AL    3,495,447
APPARATUS FOR FATIGUE TESTING AND OTHER
PURPOSES AND METHOD OF USING SAME

INVENTORS
JAY P. CONNIFF
WILLIAM F. WALKER
BY
McCormick, Paulding & Huber
ATTORNEYS

United States Patent Office

3,495,447
Patented Feb. 17, 1970

3,495,447
APPARATUS FOR FATIGUE TESTING AND OTHER PURPOSES AND METHOD OF USING SAME
Jay P. Conniff, Harwinton, and William F. Walker, Simsbury, Conn., assignors to Torin Corporation, a corporation of Connecticut
Continuation-in-part of application Ser. No. 601,925, Dec. 15, 1966. This application July 16, 1968, Ser. No. 745,297
Int. Cl. G01n *3/00*
U.S. Cl. 73—88          36 Claims

ABSTRACT OF THE DISCLOSURE

Vibration test apparatus comprising a support and drive motor for a test device. In one case support characteristics result in rotationally induced vibrations and dynamic stresses and in another torsional pulsations and dynamic stresses are induced in the test device by the drive motor. In the first case a variable speed drive motor maximizes dynamic stress at a critical speed $V_c$ as indicated by a strain gage readout and weight is added to further increase dynamic stress for accelerated fatigue testing at the speed $V_c$ in accordance with the method. In the second case a variable frequency drive maximizes dynamic stress at a critical frequency $F_c$ and torque pulsation amplitude is increased to further increase dynamic stress for accelerated fatigue testing at the frequency $F_c$ in accordance with the method. In an actual operating environment test, a single phase AC induction drive motor rotates and imposes characteristic torque pulsations on the test device and an improved torsional exciter superimposes secondary torque pulsations thereon. In a simulated environment test, an improved torsional exciter concurrently rotates and imposes torque pulsations on a test device, the latter being variable as to both frequency and amplitude to find a critical frequency $F_c$ and to increase amplitude thereat. The improved exciter is a DC motor with relatively fixed magnetic fields one of which is connected with an AC supply adjustable as to frequency and amplitude for torque pulsations of selected frequency and amplitude and is usable as both a stationary and a rotary torsional shaker, as a preloading and torsional shaking device, and as an absorption dynamometer which transmits torsional pulsations to a driving device under test.

CROSS-REFERENCE TO RELATED APPLICATION

The application is a continuation-in-part of our U.S. application Ser. No. 601,925, filed Dec. 15, 1966 entitled "Apparatus for Fatigue Testing a Rotary Device and Method of Using Same" and now abandoned.

BACKGROUND OF THE INVENTION

It is a conventional practice to test air impellers and other rotary test devices on a shaker table to excite vibration responses. This form of testing has serious limitations, however, particularly in the testing of air impellers, in the exclusion of effects on impeller response of air and centrifugal loading and in failure to duplicate the complexities of the spring-mass system of the impeller, drive motor, motor mounts, etc. Fatigue or other vibration testing under actual operating conditions overcomes these limitations but entails the serious disadvantage of excessive time expenditure. The life span of an impeller under such test may be weeks, months, or even years.

With regard particularly to fatigue or other testing involving a test device subjected to torsional pulsations, exciter apparatus has been available for concurrently rotating and imposing torsional pulsations, an illustrative example being disclosed in U.S. patent to Dudley, Ser. No. 2,384,987 entitled "Electric Vibration Generator." Such apparatus has not, however, been wholly satisfactory. As illustrated by the Dudley patent, fatigue testing with particular emphasis on torsionally induced vibrations can be conducted under simulated operating conditions but operating environment is not precisely duplicated and neither is the disadvantage of excessive time expenditure overcome. Further, it is not possible with apparatus of the Dudley type to duplicate precisely a desired program or wave form of torsional oscillation. More particularly, torsional oscillations can be induced with the Dudley apparatus but the oscillation waveform is neither variable and controllable over a wide range of frequency, amplitude and configuration, nor is the waveform a faithful reproduction of the electrical input waveform supplied to the apparatus. Instead, the output or oscillation waveform is limited as to controllability and versatility and is subject to extraneous effects and distortion. For example, an oscillation waveform in Dudley apparatus cannot be rendered independent of the speed of rotation of a test device and is thus subject to variation and distortion as a function of rotational speed when compared with the electrical input waveform.

SUMMARY OF THE INVENTION

One object of the present invention is to provide a test method and apparatus whereby an impeller or other test device can be excited under its actual operating conditions to induce rotationally or torsionally related vibrations and dynamic stresses for accelerated fatigue or other testing in a substantially shorter time period than has heretofore been possible.

Another and a more specific object of the present invention is to provide improved mathematical or graphical methods for determining fatique adequacy of test devices with respect to their design life span, the said methods employing the aforementioned test method and apparatus.

A further and a most important object of the present invention resides in the provision of improved torsional exciter apparatus particularly well suited to the aforementioned methods and apparatus but which nevertheless has general utility as both a rotary and stationary torsional shaker, a preload and torsional shaker device, an absorption dynamometer, etc.

A still further and a more specific object of the invention resides in the provision of a highly versatile torsional exciter apparatus which is capable of reproducing electrical inputs representing a wide range of desired torsional excitation waveforms with a higher degree of fidelty than has heretofore been possible and with full independence from rotational speed and other extraneous factors.

In fulfillment of the foregoing objects, test apparatus is provided and includes support and drive means operable to rotate and induce vibration and dynamic stresses in an impeller or other rotary test device. The test device support substantially duplicates actual operating construction and conditions and includes a drive motor mounting means which exhibits characteristics of non-uniform stiffness in a radial direction or plane. In consequence, test device unbalance results in rotationally related vibration and dynamic stresses at the test device as is more fully explained in articles by William F. Walker and Jay P. Conniff appearing respectively in the January 1966 and May 1968 issues of the ASHRAE Journal and titled respectively "Accelerated Life Testing of Air Impellers" and "Structural Design of Air Moving Systems."

In accordance with the method of the invention, test device vibrations and dynamic stresses, which are a function of rotational speed are maximized by varying speed to find a maximum dynamic stress $S_d$ at a critical speed $V_c$. Strain gage or other pickup means and appropriate readout instrumentation is provided for monitoring stress. Selectively attachable weight is then added to the test device to increase imbalance and to further increase dynamic stresses by known factor $f$ and the device is thereafter operated at the critical speed $V_c$ in an accelerated fatigue test for a number of cycles N. Destructive or non-destructive testing may be carried out and the fatigue adequacy of the device with respect to its design life is thereafter determined mathematically and/or graphically with reference to the factor $f$, the dynamic stress $S_d$, increased dynamic stress $fS_d$, the number of test cycles N, and known fatigue strength characteristics of material forming the device. Preferably, and as will be explained more fully hereinbelow, conventional S-N diagrams and modified Goodman diagrams are employed in graphical destructive and non-destructive methods of fatigue adequacy determination.

With regard particularly to torsional oscillations or pulsations, the test apparatus in one embodiment provides a drive motor of the type employed in the actual operating environment of the test device and which induces torsional pulsations in the device. Dynamic stresses $S_d$ in the test device, as indicated by transducer and readout instrumentation, are maximized by adjusting the frequency of the torque pulsations to a critical frequency $F_c$ and secondary torque pulsations are superimposed thereon by a torsional exciter to further increase dynamic stresses by a factor $f$. Accelerated fatigue testing is thereafter carried out recording test cycles N and fatigue adequacy may be determined by mathematical or graphical manipulation as set out above.

In another test apparatus embodiment employing simulated rather than actual operating conditions an impeller or other rotary test device is concurrently rotated and subjected to torque pulsations by an improved torsional exciter apparatus to find a critical frequency $F_c$ and the amplitude of the exciter induced pulsations is thereafter increased by a factor $f$ for accelerated fatigue testing as aforesaid.

Still further in fulfillment of the aforestated objects, the improved torsional exciter apparatus is so designed and constructed as to be readily adapted for use as both a rotary and stationary torsional shaker, a means for concurrently preloading and torsionally exciting or shaking a test device, and as an absorption dynamometer adapted to subject a driving test device to torsional oscillations. Preferably, and as will be explained more fully hereinbelow, the exciter apparatus comprises a DC electrical motor with commutation means for maintaining stator and armature fields in fixed relationship with respect to each other and with a variable current power source adjustable as to frequency and amplitude. The variable current source, in preferred form, comprises an adjustable AC source connected with the armature of the DC motor and operable to provide desired torque pulsations. When the exciter apparatus is employed as a stationary torsional shaker, the motor armature and shaft may be connected to a test device in any angular relationship or rotative position of the armature. Due to the aforesaid field fixing means, the torque pulsation waveform is a faithful reproduction of the electrical input waveform and is readily and independently adjustable at the AC source as to frequency and amplitude. No distortion occurs in the waveform and no extraneous factors are introduced as a function of relative stator and armature rotative position or other factors. Thus, the apparatus exhibits a distinct advantage over presently available stationary torsional shakers in the elimination of a fixed starting or reference point. Further and for like reasons, the available range of torsional oscillation with the exciter apparatus of the invention is substantially greater than that of conventional shakers. With the elimination of effect on output waveform of relative field and stator and armature position, the extent or angle of oscillation of a test device is restricted only by limitations on available electrical input waveforms.

When employed as a rotary torsional shaker the DC motor is provided with a DC source which may also be connected with the armature and which serves to rotatively drive the test device. Again, as a result of the aforesaid field fixing means, relative rotation of motor fields and field generating elements is rendered ineffective with regard to the relationship between an electrical input waveform and the torsional pulsation or output waveform. Thus, rotational speed may be independently varied as well as the frequency and amplitude of the torsional pulsation output. Waveform reproduction is fully controllable, and exhibits a high degree of fidelity.

When the torsional exciter apparatus is employed for combined preloading and torsional shaking, a DC source is provided as mentioned above and a test device is secured against rotation or limited as to degree of rotation. The DC source may thus serve to apply a uniform and continuous torsional preloading at the test device while the effect of the AC source is to provide a desired torsional oscillation or pulsation.

With an independently rotatively driven test device, the exciter apparatus may be connected at its armature so as to serve as an absorption dynamometer with the AC source serving to impart torsional oscillations or pulsations to the driving test device. Here again, relative rotation of motor field generating elements is ineffective with respect to the frequency and amplitude of torsional oscillations or pulsations.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

DESCRIPTION OF PREFERRED EMBODIMENTS

Figure 1:
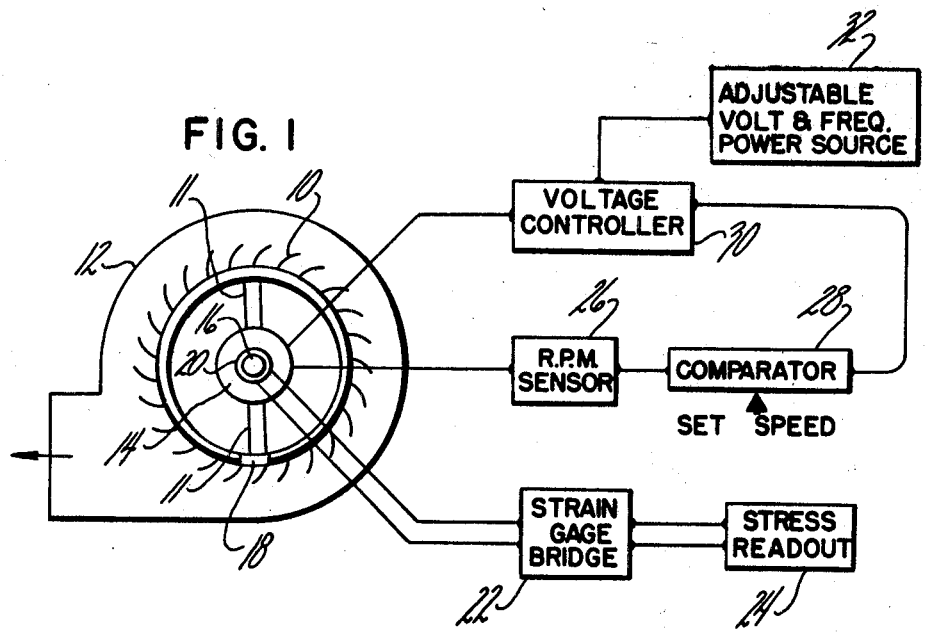
FIG. 1 is a schematic view representing one form of the present invention showing an air impeller which can be unbalanced in order to increase rotationally excited dynamic stress.

Turning now to a more detailed description of the apparatus depicted in FIG. 1, there is shown an air impeller comprising a blower 10 which is rotatably supported in a housing 12 of conventional design, and which is driven by a motor 14 mounted by vertical struts 11, 11. The rotor 14 may drive the blower directly as shown, or may be connected to the impeller drive shaft 16 by a belt drive or the like. As will be apparent, the struts 11, 11 provide non-uniform support in a radial plane and may result in rotationally induced dynamic stresses as explained in the aforementioned ASHRAE articles.

In accordance with the present invention, a transducer means is provided for obtaining stress information at a portion of the impeller to be tested, and as shown said means comprises a strain gage 18 bonded to the impeller at the portion to be tested and having leads which are extended from the rotating impeller by means of sliprings 20. The strain gage leads are connected to a strain gage bridge 22 for energizing the strain gage and for providing a single to a stress readout device 24 which may comprise a conventional oscilloscope.

Means is also provided for rotating the impeller device shaft at variable and constant speeds, and as shown said means comprises a r.p.m. sensor 26 which provides a r.p.m. signal to a comparator 28 which may be regulated to set a particular speed as indicated. The resulting speed signal is fed to a voltage controller 30, which controller is provided with an adjustable voltage and frequency power source 32 for driving the impeller drive shaft, and more particularly the motor 14, at closely controlled speeds. The foregoing apparatus for driving the impeller 10 at a constant speed is an important part of the present invention in that the method to be described hereinbelow presupposes that the stressed device be capable of being driven at a relatively constant speed for extended periods of time.

In accordance with one preferred form of the method of the present invention, a range of speed to encompass all possible operating speeds expected in service must be investigated until the indicated or dynamic $S_d$ is maximized. By way of example, an impeller rotating at 900 revolutions per minute and exhibiting a maximum stress excursion at thirty cycles per second will be found to be responding to the first harmonic of a twice per revolution driving force. By definition, the speed at which the indicated or dynamic stress from the readout device 24 is maximized will be referred to herein as the critical speed $V_c$. It is noted that the range of speeds investigated must be adequate to cover the changes in powerline voltage, changes in airloading effects, short and long term changes in motor characteristics, effects upon speed or other devices driven by the motor, and any manually or automatically adjusted speed controls in the system being investigated.

In further accordance with the present invention, means is provided for further increasing the dynamic stress at the critical speed by a particular percentage, a known factor $f$, as for example 60 percent, to provide an increased dynamic stress $fS_d$. This increase, beyond the maximum stress exhibited by the rotating system, including the "production balanced" impeller, may be achieved by selectively adding small weights, off center, to the rotating assembly. In practice, such stresses increase may be made by imposing added unbalance on any rotating component, as for example the motor, shaft, or the impeller hub. It is noted that the weight added should preferably be non-structural so that the nature of the vibration remains the same and the maximum dynamic stress increases by the same percentage as the measured dynamic stress.

Figure 3:
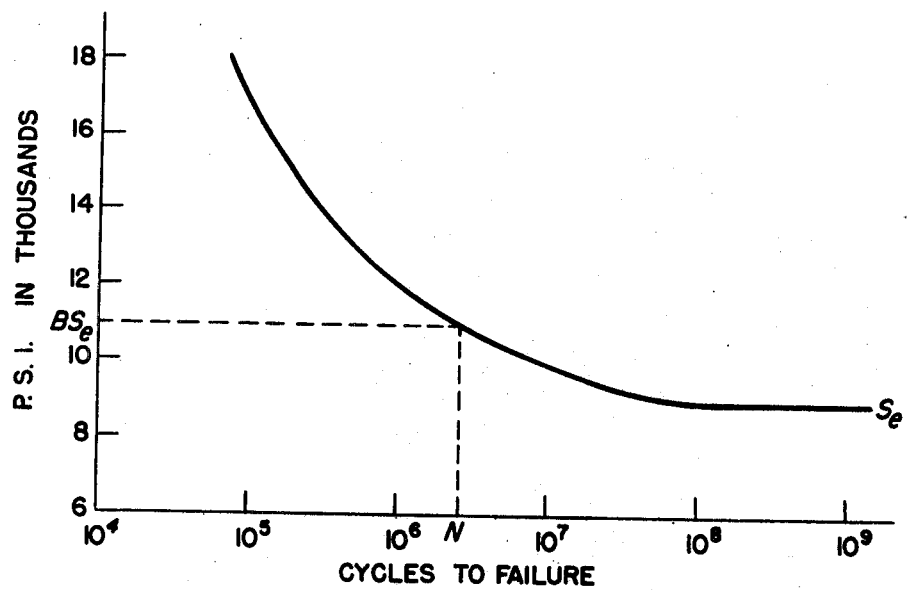
FIG. 3 is a graphical presentation of the relationship between stress, in pounds per square inches, and the number of reversals of such stress necessary to cause failure of a particular material due to fatigue.

The next step in carrying out a destructive test form of the method of the invention comprises running the apparatus of FIG. 1 at the critical speed $V_c$ until failure occurs as a result of metal fatigue. At the end of some test time $t$ the number of stress reversals, N, can be readily calculated and recorded with reference to the rotational speed $V_c$. A conventional S–N diagram, such as that shown in FIG. 3 for the material involved can then be employed to arrive at an equivalent peak stress $BS_e$.

Figure 4:
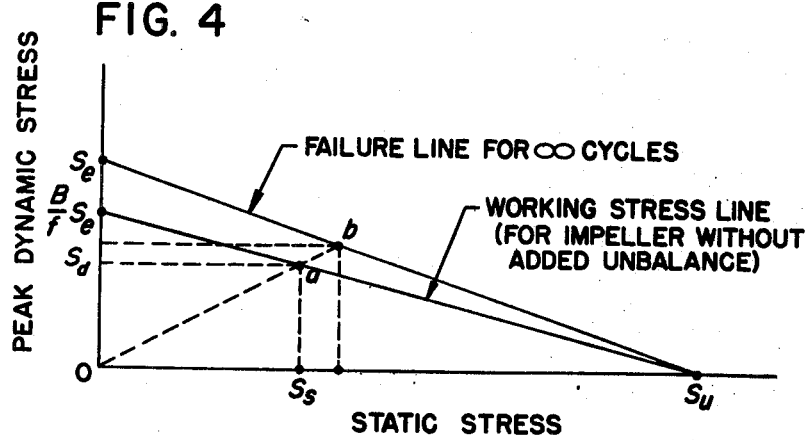
FIG. 4 is a modified Goodman diagram and shows the relationship between peak dynamic and static stress for particular numbers of stress reversals.

As is well known in the art, the data depicted in an S–N diagram do not include the effect of static stress. In the device 24 of FIG. 1, the dynamic stress fluctuation will be superimposed upon static or steady state stresses, the latter of which include any residual stress inherent in the material itself. FIG. 4 shows a modified Goodman diagram of the type which is normally resorted to in practice in order to take into account the unknown quantity represented by residual static stresses or the like. The horizontal axis of FIG. 4 is labeled "Static Stress," while the vertical axis is labeled "Peak Dynamic Stress," and a line is arbitrarily drawn between points on each axis, as shown, in order to provide a convenient means for taking into account the static stresses of an impeller being tested. The conventional approach to constructing a modified Goodman diagram consists in plotting a first line representing an infinite number of stress reversals, which line intercepts the Dynamic and Static Stress axes at the endurance limit $S_e$ and the ultimate stress $S_u$ respectively.

Still further in accordance with the method of the invention, the endurance limit $S_e$ is scaled down by a factor $B/f$ where $f$ is 1.6 for a 60 percent increase in dynamic stress. The resulting stress $$\frac{B}{f} S_e$$

is then plotted as a scaled down stress defining a second line intercepting the Dynamic and Static Stress axes at the points $$\frac{B}{f} S_e$$

and $S_u$ respectively. The area under the first line described hereinabove indicates that no failure would occur within a relatively large number of cycles, usually represented by infinity. Therefore, it can be seen that the second line represents stresses and reversals short of failure.

As a further step in the present form of the method the maximized dynamic stress $S_d$ indicated at the failure point of the production balanced impeller is entered on the vertical axis of FIG. 4 and a horizontally extending line representing this stress is used to find a point $a$ on the second line. It is noted that for the set of static and dynamic stress coordinates $S_d$ and $S_s$ defining operating stress point $a$, failure will never occur, even after an infinite number of cycles.

The final step in carrying out the present form of method of the invention comprises constructing a third line from the origin O of the Goodman diagram through point $a$ to intercept the first line described hereinabove in order to arrive at a point $b$. While any convenient means for comparison might be adopted, the basic method outlined above can be used to provide a comparison between a measured dynamic stress $S_d$ and a computed or graphically obtained, reference dynamic stress corresponding to the point $b$, which represents that stress to be expected in the event of a failure of a rotary device being tested after an infinite number of cycles. It will of course be apparent that the static stress should also be considered in order to provide a realistic fatigue testing program, and consequently a factor of safety FS will be defined herein based on both static and dynamic stress. More particularly, a factor of safety for a particular impeller design and installation might be defined as the ratio of the length of the line $\overline{O}b$ to the line $\overline{O}a$.

An alternative method of fatigue testing the rotary device of FIG. 1 will now be described. As mentioned hereinabove, the method just described involves the destruction of the impeller 10 since the number of stress reversals N is dictated by the speed $V_c$, and the time to failure $t$. If it is desirable to obtain an estimate of fatigue life with a non-destructive test, the following procedure is recommended.

Figure 6:
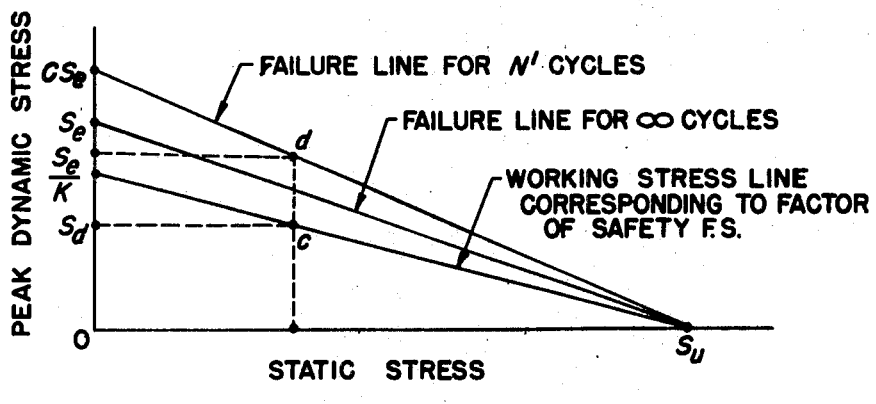
FIG. 6 is a modified Goodman diagram similar to that shown in FIG. 4, but having data depicted thereon which is useful in carrying out said alternative method of non-destructive fatigue testing.

Assume that experience from a relatively large number of samples indicates that a factor $k$ can be applied to the endurance limit $S_e$ so that only a very small percentage of tested samples will fail; that is the failure rate of samples having dynamic stress $S_e/k$ is on the order of one in a million. Then a Goodman stress line can be constructed on a Goodman diagram corresponding to such a factor $k$ as shown in FIG. 6. This step can be accomplished by constructing a second Goodman line which intercepts the dynamic stress axis at $S_e/k$. Although the value of static stress corresponding to the position of the vertical line $c-d$ is not known, the working stress line corresponding to the above-defined factor $k$ can be constructed by reference to the dynamic stress axis intercept $S_e/k$ as shown in FIG. 6. FIG. 6 shows such a line below the line corresponding to an infinite number of stress reversals.

Figure 5:
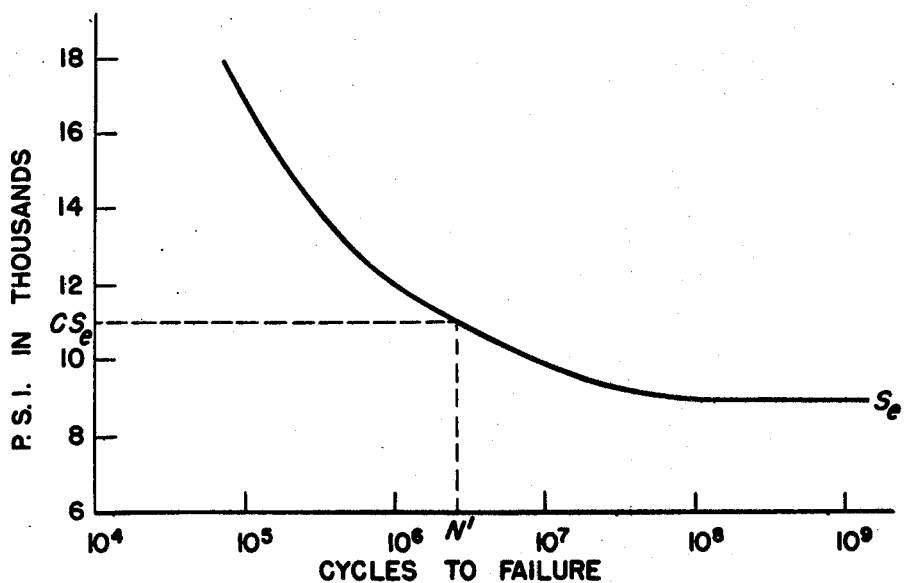
FIG. 5 is a graphical presentation similar to FIG. 3, but having data depicted thereon which is useful in carrying out an alternative method of non-destructive fatigue testing.

The maximized dynamic dynamic stress $S_d$ of the production balanced impelled is known and can be increased by a factor $f$, as for example 1.6. A third Goodman line can be constructed having dynamic stress intercept $CS_e$, where $C=f/k$. One can thus arrive at a pair of points $c$ and $d$ which by hypothesis represent the stress condition corresponding to the production balanced impeller and the unbalanced impeller respectively. $CS_e$ can be used to find a number $N'$ from the S–N diagram of FIG. 5. If the rotating system, including the unbalanced impeller, is now run for a period of time $t'$ corresponding to the number of cycles $N'$ without failure, one can assume that the stresses in a production balanced impeller are below the second Goodman line. If, on the other hand, the impeller fails prior to this time $t'$, then it will be apparent that the production impeller has failed the test.

Figure 2:
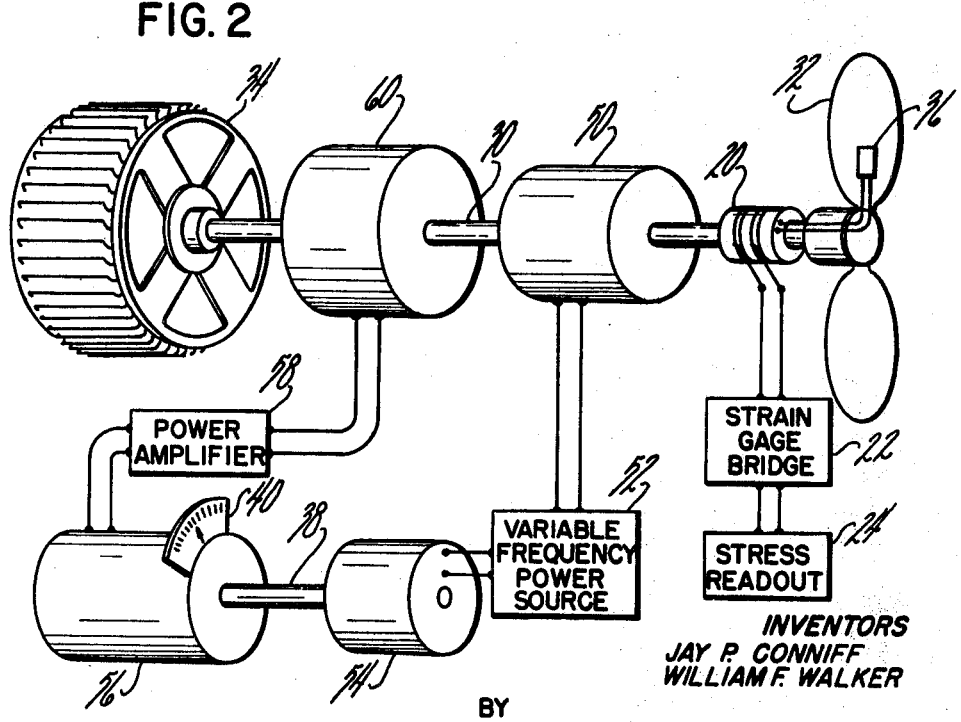
FIG. 2 represents a second form of test apparatus also in schematic form, showing a drive motor and shaft with a blower and fan mounted thereon, and also showing a torsional exciter of the present invention for superimposing secondary torque pulsations on the drive shaft.

Turning now to a second embodiment of the apparatus of the present invention and which is adapted particularly for torsionally induced dynamic stresses, FIG. 2 shows a typical centrifugal impeller or blower 34 and axial impeller or fan 32 configuration driven on a common shaft 30 by a single phase AC motor 50, the configuration shown being commonly used in many present-day air conditioners. While only the fan 32 is strain gaged, as shown at 36, it will be apparent that the impeller 34 might also be strain gaged, either singly or in combination with the fan, pursuant to one of the two test methods of the present invention described hereinabove.

The strain gage leads extend from the rotating fan through slip-rings 20 similar to the slip-rings 20 described hereinabove with reference to FIG. 1, and the strain gage 36 represents one arm of a bridge 22 with appropriate stress readout apparatus being provided at 24. The drive motor 50 comprises a production single phase AC induction motor and is connected to a variable source of AC power 52, which power source includes means for varying the frequency as well as the voltage to the motor 50. While not essential to the present form of the invention, the power source 52 might comprise one element is a servo-loop, such as that depicted in FIG. 1, for regulating speed of the motor 50 in the foregoing embodiment. The power source 52 of FIG. 2 not only provides a source of power for the motor 50 but also energizes a two-pole synchronous motor 54, which motor 54 is in turn drivingly connected to a four-pole AC generator 56 by an interconnecting drive shaft 38. While a four-pole AC generator is shown, it is to be noted that an eight or twelve-pole generator might be used in order to excite higher harmonic torsional pulsations in the drive shaft 30 than the commonly encountered twice line frequency vibrations characteristic of single phase induction AC motors. If desired, integral multiples of the frequency of torque pulsations might thus be provided at the generator output.

In further accord with presently preferred practice, the case of the generator 56 is rotatable with respect to the case of the motor 54 in order to provide a convenient means for adjusting the phase of the output signal from the generator 56 with respect to the output of the variable frequency power source 52. The AC signal from the four-pole AC generator is amplified by a power amplifier 58, which amplifier includes suitable means for varying the voltage output thereof (not shown). The output of the amplifier 58 is fed to a printed circuit DC motor 60, which motor 60 is coaxially arranged with respect to the single phase AC motor 50 and drivingly connected to the shaft 30. The use of a printed circuit DC motor permits a relatively light-weight design so that its presence has very little effect on the vibration response characteristics of the production impeller, fan and AC motor configuration. Further, the use of a printed circuit DC motor is particularly advantageous because such a motor has a large number of commutator bars, so that the switching action of the commutator results in a minimum distortion of torque pulsations.

The output from the power amplifier 58 feeds a controllable AC signal to the DC motor 60 so that the latter transmits secondary torque pulsations to the drive shaft 30 even as said drive shaft is rotated by the single phase AC motor 50. By adjustment of the power amplifier 58 the voltage input to the DC motor 60 can be varied with the result that the magnitude of the torque pulsations can be closely controlled. On the other hand, rotation of the four-pole AC generator case 56 with respect to the synchronous motor 54 permits relative adjustment and matching of the phase of the torque pulsations imparted to the shaft by the DC motor 60, with respect to the torque pulsations imposed by the single phase AC motor 50. A scale 40 on the casing of the generator 56 permits the angular relationship between the generator and the motor 54 to be set at predetermined values corresponding to particular phase relationships.

One method of utilizing the apparatus of FIG. 2 is similar to the first method described hereinabove with reference to FIG. 1 in that stress at a portion of the rotary device to be tested is maximized and then further increased by suitable means capable of rotating with the device itself. When indicated dynamic stress is maximized at a stress $S_d$ and at a critical frequency $F_c$ by frequency adjustment at the source 52, the DC motor 60, adapted to superimpose a secondary pulsating torque on the drive shaft can be employed to further increase dynamic stress by a known factor $f$ to a level $fS_d$. The superimposed torque pulsations can be shifted in phase with the torque pulsations of the AC motor 50 so as to increase the indicated dynamic stress detected by the strain gage element. That is, by utilizing a combination of the voltage adjustment provided on the amplifier output 58 and the phase adjustment of the generator 56, the indicated dynamic stress can be increased over its peak value $S_d$ by the factor $f$, as for example 1.6, and the device can then be run until the test item fails as described hereinabove with reference to the first method embodiment. The number of cycles to failure can be used to determine, from the S–N diagram, a dynamic stress intercept $BS_e$. This value can then be reduced by the factor $f$ and a Goodman line for the test item constructed having a dynamic stress intercept of $$\frac{B}{f}S_e$$

This Goodman line will represent the rotary device with no torque pulsations added. Finally, by using the actual dynamic stress $S_d$ one can proceed to find a factor of safety of the like as outlined above.

Alternatively, the rotary device of FIG. 2 can be subjected to a non-destructive test method by reducing the stress level for infinite life by a factor $k$, and then increasing the dynamic stress, by adjusting the power source 52, by a known amount, as for example by the $f$ factor (1.6). By hypothesis then the stresses on a Goodman line, with dynamic intercept $S_e/k$ can be increased by the factor $f$ to yield a third Goodman line having a dynamic stress intercept $CS_e$. From the S-N diagram of FIG. 5, a number of stress reversals N' can be obtained corresponding to a time $t'$, and the test run for such time with torque pulsations reinforced by the DC motor 60. If the impeller survives, the test specimen prior to the increase $f$ is known to have stresses below the Goodman line having the dynamic stress intercept of $S_e/k$. If, on the other hand, the impeller fails at a time less than $t'$, the stress condition in the test specimen prior to the increase $f$ can be assumed to be above this Goodman line, and the specimen has failed the test.

As will be apparent from the foregoing, the DC motor 60 serves as a torsional exciter in the FIG. 2 apparatus and has obvious utility in other environments. In fact, a torsional exciter apparatus including such a DC motor or an exciter of like capability is found to have an extremely broad range of utility. Thus, in accordance with still another aspect of the invention an improved torsional exciter apparatus is provided exhibiting the characteristics of apparatus utilizing said DC motor. A most important characteristic of such apparatus is the provision of a fixed or stationary relationship of cooperating electromagnetic fields in the exciter. Thus, changes in relative angular or rotative position of excited field generating elements such as the motor stator and armature are rendered ineffective with respect to the characteristics of torque pulsations provided by the exciter. Similarly, relative rotation of exciter field generating elements has no effect on the frequency or amplitude of output torque pulsations or the pulsation waveform and it is thus possible to reproduce faithfully an electrical input signal of independently controllable and precise configuration or waveform.

Various excited constructions exhibit the foregoing characteristic and fall within the scope of the invention. In one such construction, one field generating element may be rotated physically in order to follow precisely and thereby to remain in fixed relationship with a rotating field of a second field generating element. Obviously, however, electrical field rotation presents a more practical approach particularly when the apparatus is employed as a rotary shaker, and such constructions are contemplated in a broader sense than that illustrated by the DC motor exciter. For example, a polyphase AC motor may be employed with the armature rotated at test device rotation speed by an independent rotary device and supplied with AC current through slip rings for inducing torque pulsations at the test device, the stator field being rotated electrically at precisely the armature speed by a polyphase generator also driven at armature rotational speed.

Figure 8:
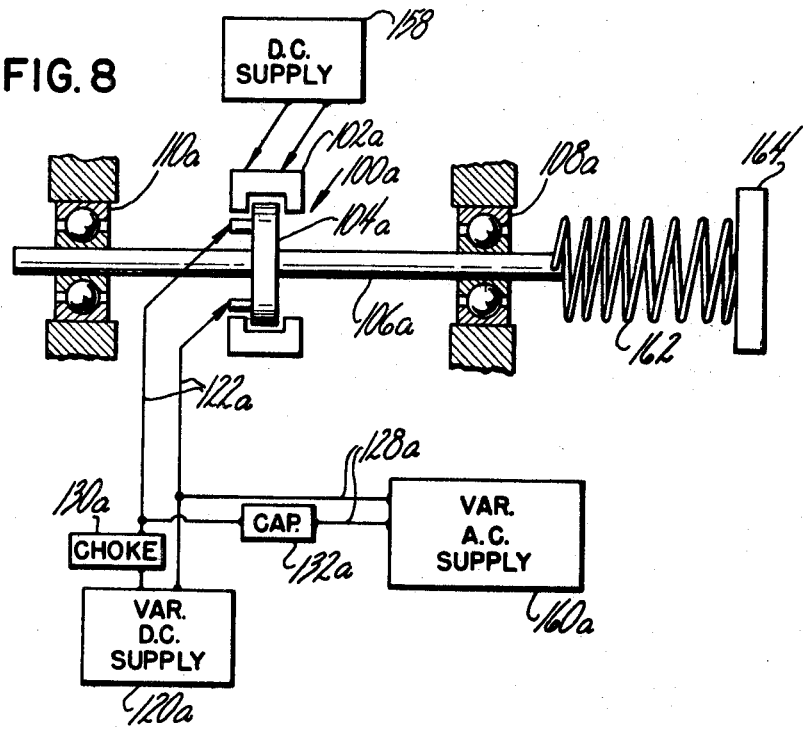
FIG. 8 is a schematic illustration of the torsional exciter apparatus adapted for use as a stationary torsional shaker and/or a preloading and shaking device.

The DC motor employed as an exciter in the presently preferred apparatus may be of a type with an electromagnetically generated stator field as illustrated schematically in FIG. 8 thus providing for independent stator and armature excitation. In the preferred form, however, a motor having a permanent magnet stator and a printed circuit armature is employed. In either case, the DC motor exhibits the aforesaid relatively fixed field characteristic and includes means providing for such fixed relationship of stator and armature fields despite changing relative rotative position or relative rotation of such field generating elements. Thus, in the permanent magnet-printed circuit DC motor, commutation means provides the desired characteristic and, more particularly, a commutator construction having a large number of poles is provided. A large number of separate current conducting loops, one hundred twenty-eight (128) in the armature of the motor shown, is provided with the result that stator and armature fields are electrically maintained in fixed relative position.

It is to be noted further that the printed circuit armature provides an additional advantage in that its relatively low inertia results in a minimum effect on the vibration response characteristics of a device under test. Still further, it is to be noted that a motor armature having nearly a pure resistive characteristic is desirable for maintaining impedance constant as frequency varies.

Figure 7:
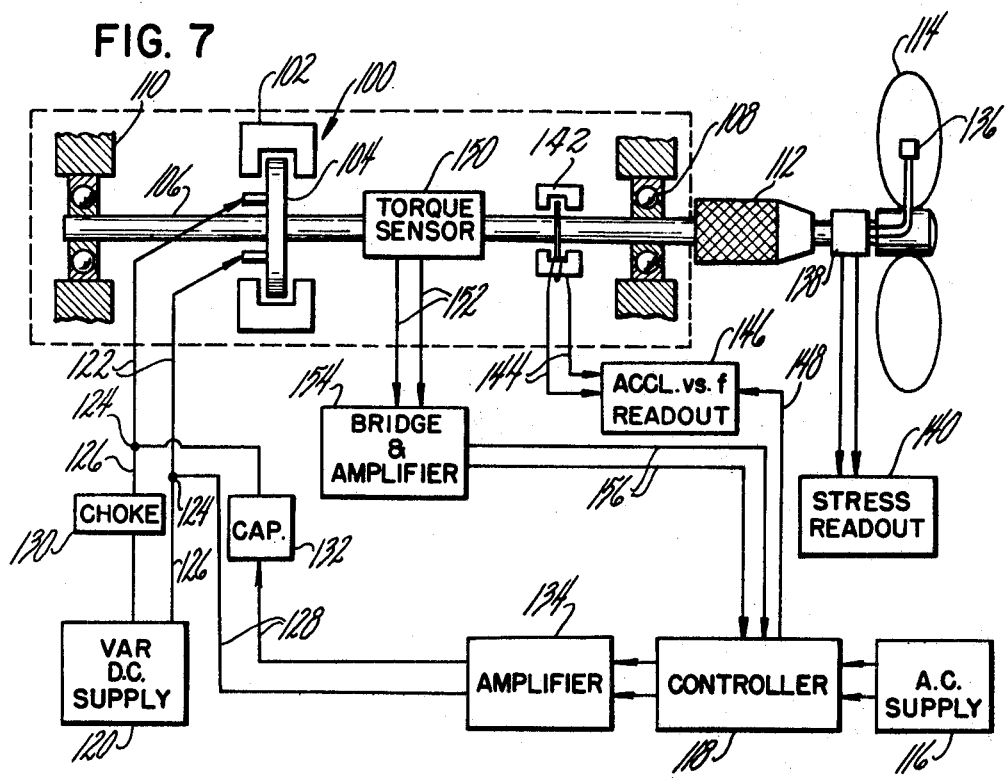
FIG. 7 is a schematic illustration of improved torsional exciter apparatus adapted for use as a rotary torsional shaker.

Referring particularly to FIG. 7, it will be observed that an exciter is shown in the form of a DC motor indicated generally at 100. The motor is of the aforesaid permanent magnet stator-printed circuit armature type with commutation as described, the said stator and armature elements being identified respectively at 102 and 104. An exciter element is connected with one of the first and second field generating elements comprising the stator and armature and is connectible further with a test device. As shown, the exciter element takes the form of an elongated motor shaft 106 which mounts the armature 104 and which is supported respectively by front and rear bearing means. The bearing means support the shaft 106 at least for limited rotation and, as shown in FIG. 7, said means comprise conventional ball bearing units 108, 110 which journal the shaft 106 for full rotation. Forwardly of the front bearing unit 108, a chuck 112 provides for detachable connection of a rotary test device, shown as an axial fan 114.

In accordance with a broad aspect of the invention, the torsional exciter apparatus also comprises a variable current power source adjustable as to frequency and amplitude and which is connected to at least one of the electro-magnetic field generating elements comprising the exciter stator and armature. The variable current power source may vary widely and may comprise even a source such as a "PULSER" adapted to vary current and control frequency and amplitude and to provide one or more current pulses as would be appropriate for torsional shock testing of a device. It is anticipated, however, that the apparatus will find more extensive utility in vibration testing and a periodically fluctuating source which may comprise sinusoidal, sawtooth, triangular, random, etc. waveforms is preferred. As shown in FIG. 7 a variable frequency and amplitude conventional AC source is provided, AC supply 116 entering controller 118 which provides for frequency and amplitude adjustment.

In FIG. 7 a means for independently rotating one field generating element of the exciter for rotary torsional shaker use comprises a variable DC source 120 connected in common with the AC source 116, 118 through suitable slip rings with the armature 104; it being understood, however, that alternative AC and DC connections to field generating elements fall within the scope of the invention. Common supply lines 122, 122 from the armature 104 extend to junctions 124, 124 with DC and AC lines 126, 126 and 128, 128 respectively. Choke 130 and capacitance 132 respectively block AC and DC in the lines 126, 128 and the AC lines 128, 128 extend to an amplifier 134 and thence to the aforementioned controller 118.

From the foregoing it will be apparent that the exciter 100 can be operated concurrently to rotate and to impart torsional pulsations to the fan 114. Adjustment of the DC supply 120 may be effected independently to vary rotational speed as desired and fully independent control of torsional pulsations may be effected by AC frequency and/or amplitude adjustment at the controller 118.

Accelerated fatigue testing in the nature of that described above but under simulated rather than actual conditions can be carried out with the torsional exciter apparatus of FIG. 7. Thus, the fan 114 may be provided with stress indicating means in the form of strain gage 136, slip rings 138, and stress readout instrumentation at 140. The apparatus may then be operated to determine a maximized dynamic stress $S_d$ at critical frequency $F_c$ by adjustng AC frequency, the amplitude of torsional pulsations may then be further increased by a known factor $f$ to provide stress $fS_d$ through AC amplitude adjustment, and further testing may be conducted for a number of cycles N for mathematical or graphical determinations as described above.

FIG. 7 also illustrates elements adapting the exciter apparatus for advantageous use in determining natural frequency of rotary test devices and for various other purposes. An angular accelerometer is provided at 142 on the exciter element or motor shaft 106 and has lines 144, 144 which extend to readout instrumentation at 146. A line 148 from the controller 118 also connects with the readout 146 and supplies a frequency signal thereto. The accelerometer is operable with the shaft 106 rotating to provide an acceleration signal to the readout 146 and may comprise a Hoodwin Model 220A Angular Accelerometer. Thus, an acceleration versus frequency readout is provided and may be conveniently indicated by a conventional chart recorded for ready determination of the natural frequency of rotary test devices such as fan 114.

Preferably, feed back means is also provided in the apparatus to compare a signal or actual torque pulsations with an input torsional pulsation signal whereby accurately to maintain actual pulsations at preset levels. Such means may of course vary widely but is shown in the form of a torque sensor 150 mounted on the motor shaft 106, and responsive to actual torque pulsations, lines 152, 152 extending from the sensor 150, a bridge and amplifier unit 154 receiving the sensor signal from the lines 152, 152 and lines 156, 156 from the unit 154 to the controller 118. The torque sensor 150 is of the strain gage, slip ring type and a Model 1104S–500 unit manufactured by Lebow Instruments is presently employed. The bridge-amplifier 154 presently employed is manufactured by Ellis Associates and is identified as a BAM–1 unit. The controller 118 is of a type conventionally used with axial and stationary torsional shakers and includes circuitry for comparing an actual excitation or pulsation signal from a sensor such as 150 with an input signal and modifying the latter to maintain the former at preset levels. The controller employed may be identified as a Model 1018 Exciter Controller manufactured by B & K Instruments Inc.

In FIG. 8 the torsional exciter apparatus is shown adapted for stationary torsional shaker use and for use as a preloading and shaking device, like elements being identified with like reference numerals with the suffix a (re FIG. 7). DC motor 100a may be of the shunt-connected type with a separate DC supply 158 for the stator 102a and with an armature connected DC supply 120a provided for rotating or tending to rotate the shaft 106a. A variable frequency and amplitude AC supply 160a also supplies the armature 104a for inducing torque pulsations in a test device and the motor includes means such as commutators for relatively fixing the stator and armature fields as mentioned above. Additional control, feedback, readout elements, etc. may of course be provided as in FIG. 7.

It will be apparent that the apparatus of FIG. 8 can be operated as a stationary torsional shaker with the DC supply 120a in an off condition and ineffective to rotate the motor armature 104a. Thus, a test device such as a coil spring 162 may be connected at one end portion with the motor shaft 106a and excited torsionally thereby, the AC source 160 being adjusted for desired frequency and amplitude of torque pulsations. A mounting pad or block 164 secures an opposite end portion of the spring 162.

In operation as a stationary shaker the FIG. 8 apparatus exhibits distinct advantages over presently available shakers. Thus, a starting or reference point for imposing torsional pulsations may be selected at random for test device mounting convenience or other considerations. That is, there is no limitation to a fixed reference point and the shaft 106a may be turned through 360° to any desired rotative position for convenient attachment of a test device. Due to the mechanical independence of stator and armature and the relatively fixed field characteristic of the exciter, relative stator and armature position has no effect on the frequency, amplitude etc. of the output torque pulsations and a fixed and independently controllable input current-output pulsation relationship is maintained. For added convenience the mount 164 may be adapted for rotatable adjustment.

Further, the fixed field and mechanically independent stator and armature characteristics enable the exciter to provide wide angle torsional oscillation to a degree heretofore unobtainable. In conventional stationary torsional shakers the angle of oscillation is severely limited by mechanical means and by the characteristics of magnetic fields encountered. In the absence of the relative field fixing characteristics of the present exciter, there is undesired distortion of the output pulsation waveform with respect to the input current waveform when wide angle oscillation is attempted with such conventional shakers.

In use as a preloading and torsional shaking apparatus, the FIG. 8 elements may be operated as described above but with the DC source operative. That is, the DC source may be adjusted to a desired value to cause stator and armature field interaction tending to rotate a test device such as the spring 162. Torsional preloading of the device to a desired degree will result with the device restrained by the mount 164 and AC current supplied to the armature 104a will provide the desired torsional pulsations for various types of testing under preload.

Figure 9:
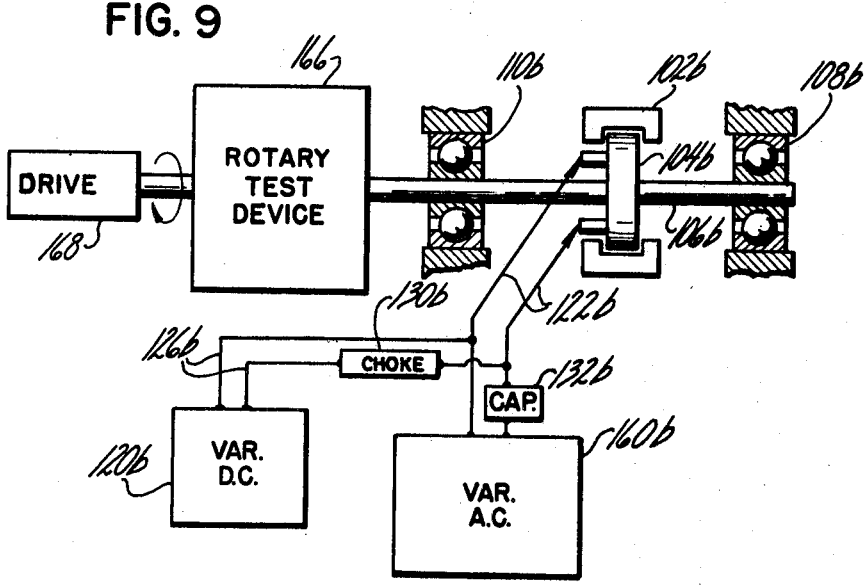
FIG. 9 is a schematic illustration of the torsional exciter apparatus adapted for use as an absorption dynamometer.

In FIG. 9 the exciter apparatus is shown adapted for absorption dynamometer use with elements corresponding to FIG. 7 and 8 elements identified with like reference numerals but with the suffix b. Means for rotating or oscillating the shaft 106b and armature 104b independently of the AC source 160b takes the form of a mechanically connected rotary test device 166 which may be self operated or externally rotatively or oscillably driven as indicated at 168. Variable DC supply or load 120b may be employed either to assist or oppose the rotative driving force of the test device and AC source 160b may be employed as above to impart desired torsional pulsations to the test device. Various additional elements not shown but which are conventional in absorption dynamometer testing may of course be provided.

We claim:

1. A method for accelerated fatigue testing of a rotary device in an operating environment where the device is subjected to dynamic stress; said method comprising the steps of applying a transducer to a portion of the rotary device to be tested and providing stress indicating readout instrumentation therefor, operating the device in said environment so as to maximize the amplitude of the dynamic stress $S_d$ as indicated by said readout instrumentation, increasing the amplitude of said dynamic stress by a known factor $f$ with reference to said stress readout instrumentation whereby to provide a dynamic stress $fS_d$, further operating the device at the increased dynamic stress level for an accelerated test period substantially shorter than the design life of the device, recording the number of cycles N in said accelerated test period, and determining the fatigue adequacy of the device with respect to its design life from the factor $f$, the maximized dynamic stress $S_d$, the increased dynamic stress $fS_d$, the number of test cycles N, and the known fatigue strength characteristics of material forming the device.

2. A method for accelerated fatigue testing of a rotary device as set forth in claim 1 wherein said device in its operating environment has supporting structure of non-uniform stiffness in a radial plane, wherein such supporting structure is provided during test to subject the device to dynamic stress as a function of rotational speed, wherein said step of maximizing the dynamic stress comprises the variation of rotational speed of the device to determine a critical speed $V_c$ at which the device exhibits a maximum dynamic stress as indicated by said readout instrumentation, and wherein said step of increasing the dynamic stress comprises adding weight in the proper magnitude and position on the device to increase the indicated dynamic stress by the factor $f$.

3. A method for accelerated fatigue testing of a rotary device as set forth in claim 2 wherein non-structural weight is added to the device.

4. A method for accelerated fatigue testing of a rotary device as set forth in claim 2 wherein the step of further operating the device at the increased stress level is continued until failure occurs, and wherein the following steps are included; recording the cycles N to failure so that an equivalent peak stress $BS_e$ can be obtained from an S–N diagram for the material involved, plotting a modified Goodman diagram for the material, said diagram comprising a first line representing an infinite number of stress reversals and intercepting the dynamic and static stress axes at the endurance limit. $S_e$ and the ultimate stress $S_u$ respectively, plotting a second line on said Goodman diagram which intercepts said static axis at said ultimate stress $S_u$ and which intercepts said dynamic axis at a scaled down stress $$\frac{B}{f} S_e$$

constructing a third line through the origin O of the Goodman diagram, and through a point $a$ on the second line corresponding to the dynamic stress $S_d$ at the determined location of failure, and extending said third line to cross said first line so that the dynamic stress $S_d$ can be compared with a reference dynamic stress representing the indicated stress at failure if the device were subjected to an infinite number of stress reversals.

5. A method for accelerated fatigue testing of a rotary device as set forth in claim 2 wherein the following steps are included; plotting a modified Goodman diagram for the material of the device, said diagram comprising a first line representing an infinite number of stress reversals and intercepting the dynamic and static stress axes at the endurance limit $S_e$ and the ultimate stress $S_u$ respectively, plotting a second line on said Goodman diagram which intercepts said static axis at said ultimate stress $S_u$ and which intercepts said dynamic axis at a scaled down stress $S_e/k$ where $k$ is a factor determined by statistical variations of stress values from the mean values depicted on said S–N diagram, constructing a third line on said Goodman diagram which intercepts said static axis at said ultimate stress $S_u$ and which intercepts said dynamic axis at a stress $CS_e$ which can be computed by multiplying $S_e/k$ by the factor $f$ representing the stress increase above, and rotating the device at said increased dynamic stress level for a period of time $t'$ corresponding to the number of stress reversals N′ obtained from an S–N diagram for the material involving using the Stress $CS_e$ to enter said S–N diagram.

6. A method for accelerated fatigue testing of a rotary device as set forth in claim 1 wherein said device in its operating environment is rotated by a pulsating torque rotary drive means, wherein such drive means is provided during test to subject the device to dynamic stress as a function of the frequency of the pulsating torque of the drive means, wherein said step of maximizing the dynamic stress comprises the variation of the pulsating torque frequency to determine a critical frequency $F_c$ at which the device exhibits a maximum dynamic stress as indicated by said readout instrumentation, and wherein said step of increasing the dynamic stress comprises superimposing a second pulsating torque on said device to increase the indicated dynamic stress by the factor $f$.

7. A method for accelerated fatigue testing of a rotary device as set forth in claim 6 wherein said step of providing said second pulsating torque comprises the subsidiary steps of providing cooperating first and second magnetic fields at least one of which is effective on said device, maintaining said fields in fixed relationship with respect to each other during rotation of said device, and varying the strength of at least one of said fields periodically.

8. A method for accelerated fatigue testing of a rotary device as set forth in claim 7 wherein said one magnetic field is varied as to both frequency and magnitude, the frequency of the field being varied selectively to match the frequency of said drive means torque pulsations and integral multiples thereof, and the magnitude of the field being varied to increase the indicated dynamic stress by said known factor $f$.

9. Apparatus for accelerated fatigue testing of a rotary device comprising a transducer applied to a portion of the device to be tested, stress indicating readout means operatively connected with said transducer, support and drive means for said device operable to rotate the same and to induce dynamic stress therein, means for varying the operation of said drive means whereby to maximize dynamic stress as indicated by said readout means, and means for increasing the maximized dynamic stress for acceleration of fatigue testing.

10. Apparatus for accelerated fatigue testing of a rotary device as set forth in claim 9 wherein said support and drive means comprises a supporting structure of non-uniform stiffness in a radial plane and a drive motor, said non-uniform supporting structure contributing to the creation of dynamic stress in the device as a function of rotational speed of the device, wherein said means for maximizing such dynamic stress comprises a means for varying the rotational speed of said drive motor whereby to determine a critical speed of the device with reference to said readout means, and wherein said stress increasing means comprises at least one weight selectively attachable to the rotary device to increase the maximized dynamic stress.

11. Apparatus for accelerated fatigue testing of a rotary device as set forth in claim 10 wherein said speed varying means also serves as a speed control device for maintaining drive motor speed constant at a selected level whereby to maintain said rotary device at said critical speed.

12. Apparatus for accelerated fatigue testing as set forth in claim 9 wherein said transducer comprises at least one strain gage attached to said rotary device.

13. Apparatus for accelerated fatigue testing as set forth in claim 9 wherein said drive means comprises a drive motor having pulsating torque characteristics and which subjects the rotary device to dynamic stress as a function of the frequency of such pulsating torque, wherein said means for varying the operation of said drive means to maximize dynamic stress comprises a variable frequency supply means for said drive motor, and wherein said maximized dynamic stress increasing means comprises a torsional exciter operable to superimpose a second pulsating torque on said rotary device.

14. Apparatus for fatigue testing of a rotary device as set forth in claim 13 wherein said torsional exciter comprises an electro-magnetic device having means which generate cooperating first and second magnetic fields at least one of which is effective on said rotary device, said field generating means serving also to maintain said two fields in fixed relationship with respect to each other, and wherein said exciter has operatively associated therewith means for varying the strength of at least one of said fields periodically.

15. Apparatus for fatigue testing of a rotary device as set forth in claim 14 wherein said means operatively associated with said exciter comprises a variable frequency AC power source, a phase shifting device, and a means for matching the frequency of said drive motor torque pulsations, said last mentioned means being operable to control the frequency of said periodic strength variations of said one field.

16. Apparatus for fatigue testing of a rotary device as set forth in claim 15 wherein said frequency matching means is further adapted to match integral multiples of said drive motor pulsations, and wherein said means operatively associated with said exciter also comprises an amplifier adjustable to vary the magnitude of said periodic strength variations of said one field and thus to vary the amplitude of said second torque pulsations.

17. Apparatus for fatigue testing of a rotary device as set forth in claim 15 wherein said drive motor, said exciter and said means operatively associated with the latter are connected in common with said variable frequency AC power source, and wherein said frequency matching means comprises a synchronous motor connected with said AC source and a generator connected with and driven thereby, said synchronous motor and generator being constructed to provide an output frequency of drive motor torque pulsations or integral multiples thereof as aforesaid.

18. Apparatus for fatigue testing of a rotary device as set forth in claim 17 wherein said generator is of the rotatable case type for phase shifting operation as required to effect exciter torque pulsations in phase with drive motor torque pulsations.

19. Apparatus for fatigue testing of a rotary device as set forth in claim 18 wherein said drive motor is of the single phase AC induction type and creates torque pulsations at twice line frequency ($2f$), and wherein said generator has twice the number of poles of said synchronous motor whereby to provide a twice line frequency ($2f$) output signal to said exciter.

20. Apparatus for fatigue testing of a rotary device as set forth in claim 19 wherein said torsional exciter comprises a DC motor having a stator and armature the latter of which is connected with said rotary device, the aforesaid first and second magnetic fields being respectively stator and armature fields and said one field being the armature field, the aforesaid generator being connected with the armature for supply of said ($2f$) output signal thereto, and said motor being provided with commutation means whereby said two fields are electrically maintained in fixed relationship with respect to each other.

21. Apparatus for fatigue testing of a rotary device as set forth in claim 20 wherein said DC motor has a low inertia printed circuit armature for minimum effect on vibration response characteristics of said rotary device.

22. Apparatus for fatigue testing of a rotary device as set forth in claim 13 wherein said torsional exciter comprises a DC motor connected with said rotary device and with an AC supply source and operable to superimpose said second torque pulsations on said drive motor torque pulsations.

23. Apparatus for fatigue testing of a rotary device as set forth in claim 22 wherein said DC motor has a low inertia printed circuit armature connected with said rotary device for minimum effect on vibration response characteristics of said device.

24. Apparatus for fatigue testing of a rotary device as set forth in claim 22 wherein said DC motor has a stator and an armature the latter of which is connected with said rotary device and said AC source, and wherein said motor is provided with commutation means whereby stator and armature fields are electrically maintained in fixed relationship with respect to each other during motor operation.

25. Apparatus for fatigue testing of a rotary device as set forth in claim 24 wherein said DC motor has a low inertia printed circuit armature.

26. Apparatus for fatigue testing of a rotary device as set forth in claim 9 wherein said drive means for said rotary device comprises a torsional exciter operable both to rotate said device and to impart torque pulsations thereto, wherein said stress maximizing means for varying operation of said drive means comprises a frequency varying means connected with said exciter and operable to vary the frequency of torque pulsations imparted to the rotary device, and wherein said means for increasing maximized dynamic stress comprises a means for varying the magnitude of the torque pulsations imparted to said rotary device by said exciter.

27. Apparatus for fatigue testing of a rotary device as set forth in claim 26 wherein said torsional exciter is an electro-magnetic device having at least two elments comprising a stator and an armature, each of said elements having an associated magnetic field and said device also including means for maintaining said fields in fixed relationship with respect to each other, wherein said frequency varying means comprises a variable frequency AC source connected with one of said elements whereby to vary its associated field and thus to vary the frequency of torque pulsations applied by the exciter to said rotary device, and wherein said means for increasing maximized dynamic stress comprises a means for varying the amplitude of the AC signal supplied to said one element and thereby varying the magnitude of the torque pulsations applied to said rotary device by said exciter.

28. Apparatus for fatigue testing of a rotary device as set forth in claim 26 wherein said torsional exciter is a DC motor having at least two elements comprising a stator and an armature, wherein an AC source is connected with one of said elements, and wherein said stress maximizing and increasing means respectively comprise means for varying frequency and amplitude of an AC signal supplied from said source to said one element.

29. Apparatus for accelerated fatigue testing of a rotary device as set forth in claim 28 wherein a DC source is provided and is connected with one of said motor elements to provide for rotation of said rotary device by said motor.

30. Apparatus for accelerated fatigue testing of a rotary device as set forth in claim 29 wherein said AC and DC sources are connected in common with the armature of said motor.

31. Apparatus for accelerated fatigue testing of a rotary device as set forth in claim 30 wherein said DC motor has a low inertia printed circuit armature.

32. Torsional exciter apparatus comprising an exciter element connectible with and adapted to transmit torque pulsations to a test device, bearing means supporting said element at least for limited rotation, a first magnetic field generating element connected with said exciter element, a second magnetic field generating element arranged for cooperation of its field with the field of said first field generating element, means for maintaining said two fields in fixed relationship with respect to each other, a periodically fluctuating variable current power source including frequency and amplitude adjusting means, means connecting said power source with one of said first and second field generating elements to vary its field strength and to thereby induce torque pulsations in said exciter element of selected frequency and amplitude independently of the relative position of said field generating elements, a second power source comprising a DC supply connected with one of said field generating elements to rotate said exciter element for concurrent torsional excitation and rotation of the test device, and dynamic stress indicating means connected with at least one of the elements comprising the exciter element and test device.

33. Torsional exciter apparatus as set forth in claim 32 wherein said stress indicating means comprises strain responsive means connected with said test device and readout instrumentation connected therewith and operated thereby.

34. Torsional exciter apparatus as set forth in claim 32 wherein said stress indicating means comprises angular acceleration responsive means connected with said exciter element and test device and readout instrumentation connected therewith and operated thereby.

35. Torsional exciter apparatus as set forth in claim 34 wherein said angular acceleration responsive means comprises a rotatable angular accelerometer mounted on said exciter element, and wherein said readout instrumentation is connected also with said adjustable frequency source and operates to provide an angular acceleration versus frequency readout.

36. Torsional exciter apparatus as set forth in claim 35 wherein said field generating elements comprise respectively a printed circuit armature and a stator of a DC motor, wherein said exciter element comprises the motor shaft, wherein said variable frequency source comprises an adjustable frequency and amplitude AC source, wherein feedback means is provided from said shaft and test device operable to provide a signal of actual excitation, wherein a controller is provided and is connected to receive said signal, and wherein said controller is also connected with said AC source so as to receive an input excitation signal, said controller operating automatically to modify and transmit said input signal whereby to maintain actual excitation at preset levels.

References Cited

UNITED STATES PATENTS

| | | | |
|---|---|---|---|
| 2,384,987 | 9/1945 | Dudley | 73—71.5 |
| 2,404,965 | 7/1946 | Kilgore et al. | 73—71.5 |
| 3,292,425 | 12/1966 | Conn | 73—67.2 X |

JERRY W. MYRACLE, Primary Examiner

U.S. Cl. X.R.

73—91